United States Patent [19]

Jalbert

[11] Patent Number: 4,729,530

[45] Date of Patent: Mar. 8, 1988

[54] CONTROL FLAPS FOR A MULTI-CELL WING TYPE CANOPY

[76] Inventor: Domina C. Jalbert, 425 Wavecrest Ct., Boca Raton, Fla. 33432

[21] Appl. No.: 46,780

[22] Filed: May 7, 1987

Related U.S. Application Data

[63] Continuation-in-part of Ser. No. 783,024, Oct. 2, 1985, abandoned.

[51] Int. Cl.⁴ .............................................. B64D 17/14
[52] U.S. Cl. .................................... 244/152; 244/145; 244/153 R; 244/155 A
[58] Field of Search ........... 244/142, 145, 152, 153 R, 244/155 A, 215

[56] References Cited

U.S. PATENT DOCUMENTS

| | | | |
|---|---|---|---|
| 3,131,894 | 5/1964 | Jalbert | 244/152 |
| 3,412,963 | 11/1968 | Struble, Jr. | 244/152 |
| 3,589,654 | 6/1971 | Snyder | 244/152 |
| 4,191,349 | 3/1980 | Pravaz | 244/152 |

Primary Examiner—Joseph F. Peters, Jr.
Assistant Examiner—Rodney Corl
Attorney, Agent, or Firm—Jack N. McCarthy

[57] ABSTRACT

A control for a multi-cell ram air wing type canopy includes rearwardly extending plain flexible control flaps at the trailing edge thereof, one control flap being positioned at each side. A control line is connected to each rearwardly extending control flap to place it in a desired position for proper flight. A containment device can be fixed to the canopy for containing each control flap when its extension rearwardly is not desired. A safety device is included to hold a control line so that a predetermined force is required to release the control line for pulling a control flap from its containment device. An edge pocket is included in each control flap for increased stabilization of control. A control line support and guide arrangement provides for ease of canopy control.

10 Claims, 16 Drawing Figures

Fig. 14

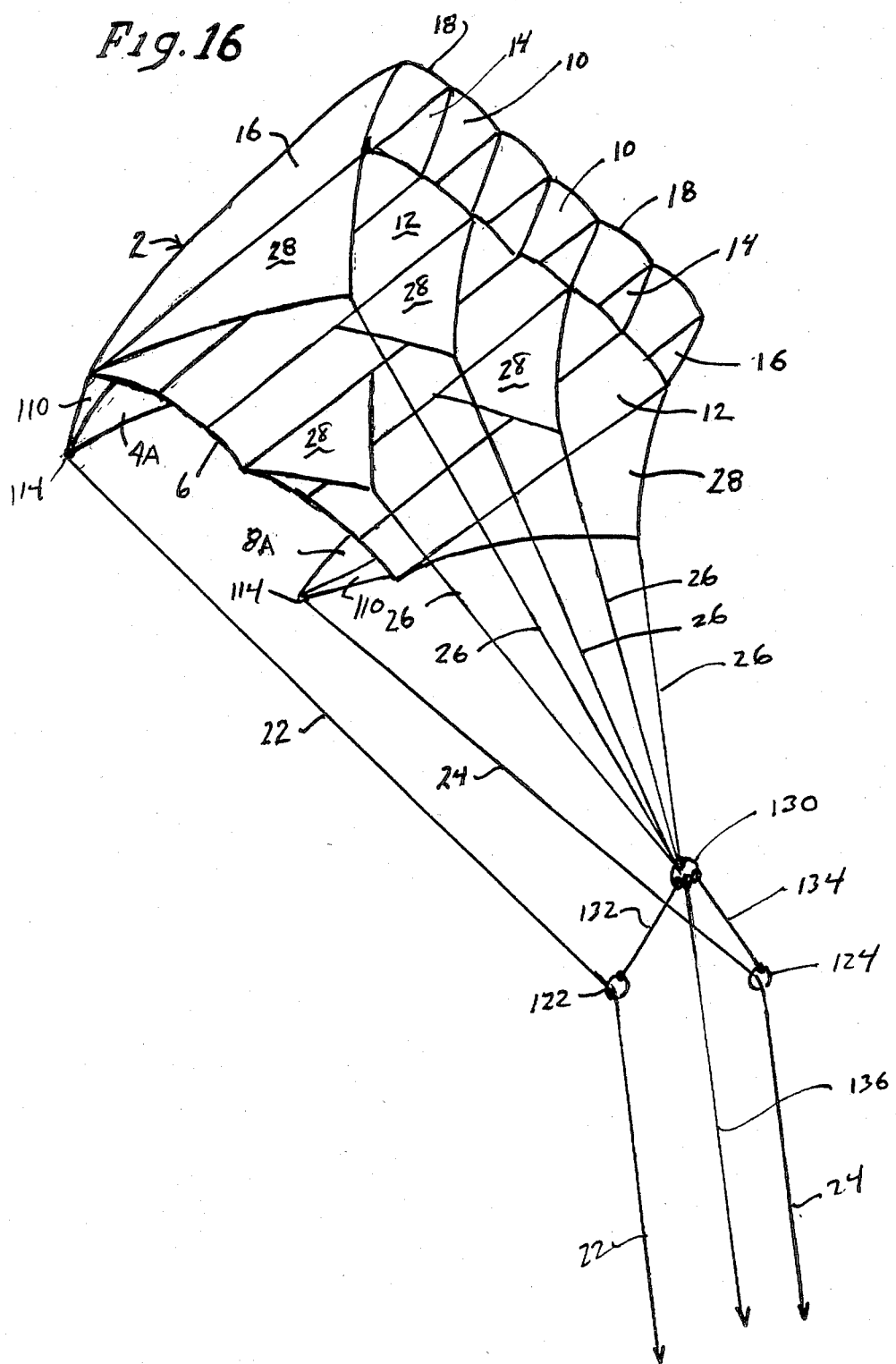

CONTROL FLAPS FOR A MULTI-CELL WING TYPE CANOPY

CROSS-REFERENCE TO RELATED APPLICATION

This application is a continuation-in-part of application Ser. No. 783,024, filed Oct. 2, 1985 for *Control Flaps for a Multi-Cell Wing Type Canopy* to Domina C. Jalbert, now abandoned.

TECHNICAL FIELD

This invention relates to parachutes and kites, especially of the type having a ram air, multi-cell, wing type canopy.

BACKGROUND ART

Kites have had tails of various configurations connected to the trailing edge, and parachutes have had multiple control lines secured to the trailing edge of the canopy. A parachutist can deform a very large part of the trailing edge of the canopy, filled with ram air, by pulling it downwardly by a control line, or lines, an amount to achieve a desired control. Deforming one end will cause turning, and deforming both ends in a like manner will cause a forward reduction in speed.

Kites usually have a stabilizer connected to the trailing edge including a tail, such as ribbons of material (of different length) for stabilizing control.

Patents setting forth a background for this invention are: U.S. Pat. Nos. Re. 26,427; U.S. Pat. Nos. 3,285,546; 3,412,963; 3,524,613; 3,558,087; 3,740,008; 3,749,337; 3,806,071; 3,893,641; 3,944,169; 4,015,801; 4,098,475; and 4,191,349.

DISCLOSURE OF INVENTION

An object of the present invention is to provide a control device including rearwardly extending plain flexible control flaps at the trailing edge of a ram air, multi-cell, wing type canopy, one control flap positioned at each side of the trailing edge. In tethered flight, a control line extends rearwardly from the rear of each control flap for connection with a tail to induce automatic stability. In free flight, a control line extends downwardly to a parachutist for manual actuation for each control flap; individual operation of the control flaps causing rotation, and simultaneous operation of the control flaps causing a braking effect.

Another object of the invention is to have each of the rearwardly extending control flaps formed from a sheet of flexible material as a triangle with one side connected to the trailing edge of the canopy and the rearwardly extending apex being connected to the control line. The triangular control flap can be formed of two triangular sections side-by-side with the connecting sides of the two triangular sections being curved toward each other so that when they are connected together, the resultant triangular control flap has a predetermined pocket located therein.

A further object of the present invention is to provide a control flap at each side of the trailing edge of the ram air, multi-cell, wing type canopy having a stabilizing edge pocket along the outer edge of each control flap. The edge pocket is located on the lower, or under, side of the control flap and has an inner opening along its length for receiving air flow from under the lower flexible wall. A triangular control flap is shown with the edge pocket being on the outer edge of each triangular control flap.

Another object of the present invention is to have each edge pocket triangular in shape with the side connected to the trailing edge being closed and being fixed to the trailing edge. Air entering said edge pockets supports the trailing edge to prevent uncontrolled collapse of the wing type canopy.

A further object of the present invention is to have the edge pocket extend over the end of the trailing edge and be open to permit flow therethrough to ensure opening of the edge pocket.

A further object of the present invention for free flight is to provide a closed containment enclosure adjacent the trailing edge of the canopy for each flexible rearwardly extending control flap for containing each control flap folded up when its projection is not wanted, and permitting the withdrawal of each control flap by a control line when its use is desired; said containment enclosure providing as flat a package as possible when closed to have minimum interference with air flow thereover. Said containment enclosure comprises a small closure flap, longitudinally aligned with the cooperating rearwardly extending control flap and being pivotally connected to the canopy forwardly of the trailing edge. Connecting means are provided for connecting the rear end of said small closure flap to said trailing edge to enclose the folded control flap; said connecting means providing for the control line connected to said folded control flap to extend rearwardly therethrough to permit it to be pulled by an operator, such as a parachutist, or by remote control, this action releasing said connecting means and obtaining release of the folded control flap, air flow over said partially rearwardly extending control flap aiding in withdrawing it to its full extended position.

Another object of the present invention for free flight is to provide a safety holding device for the closed containment enclosure so that control is maintained over the release of said folded flexible control flap as the canopy is opened.

A further object of the invention is to provide for a safety device requiring a predetermined force on a control line to release said safety device and connect the control line directly to the folded flexible control flap.

Another object of the invention is to provide a control flap which has its connected side spaced from the trailing edge of the canopy by straps leaving an opening between the flap and trailing edge for an air flow. The apex of the control flap can also have an opening or openings.

A further object of the invention is the reduction of the multiple number of control lines attached to the trailing edge of existing canopies for control thereof, such as braking and direction, by the use of the control flaps.

Another object of the invention is to provide a bridle connected to a main ring on the ends of the canopy supporting lines; two secondary rings are each connected to the main ring by a cord, one secondary ring extends to each side of said main ring. A tether, or cargo, line can be attached to the main ring while each control line is moved through a secondary ring to control the canopy.

BRIEF DESCRIPTION OF THE DRAWINGS

FIG. 16 is a view of a tethered canopy with a support line and two control lines connected by a bridle arrangement.

BEST MODE FOR CARRYING OUT THE INVENTION

Figure 1:
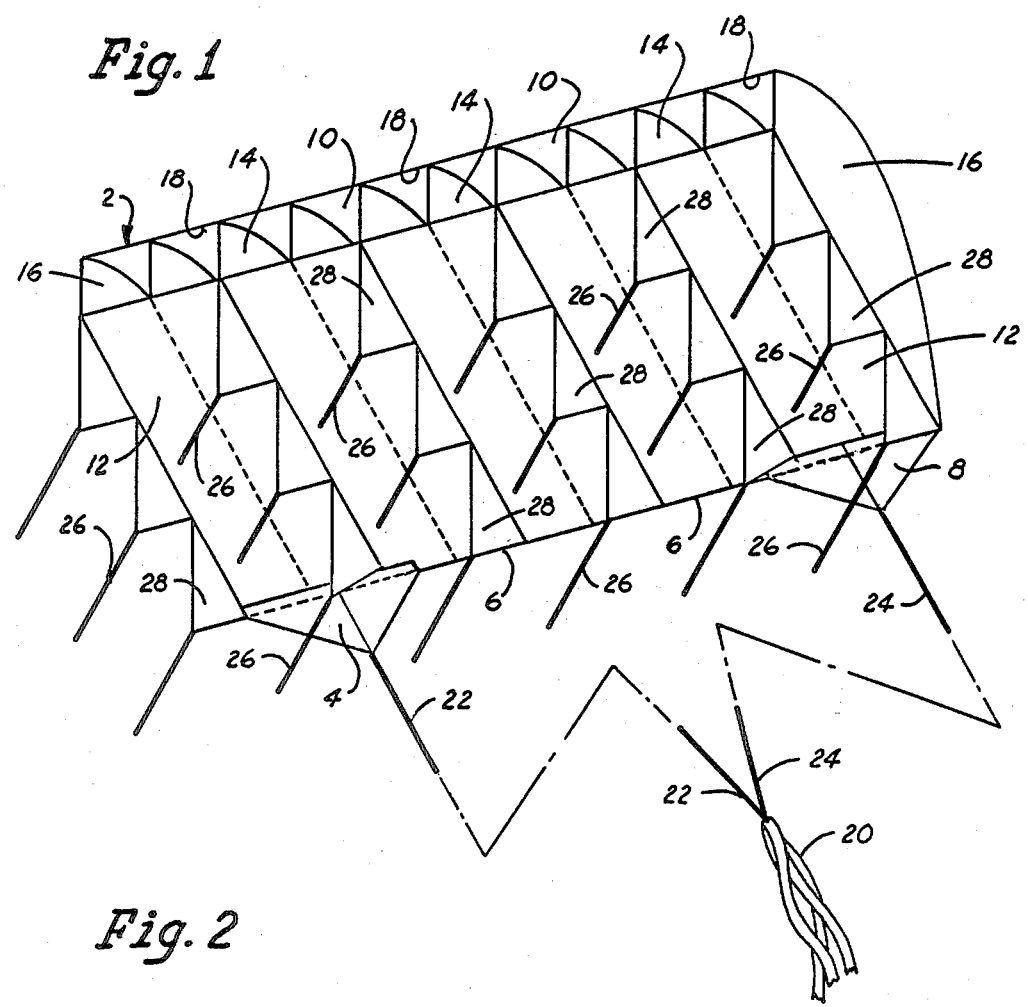
FIG. 1 is a perspective view from below of a ram air, multi-cell, wing type canopy in tethered flight with two rearwardly extending control flaps, each connected by a stabilizing control line to a tail.

The ram air, multi-cell, wing type canopy 2 of FIG. 1 includes a triangular flap 4 with one edge connected to one side of the trailing edge 6 of said canopy 2 and a triangular flap 8 with one edge connected to the other side of the trailing edge 6. The ram air, multi-cell, wing tpe canopy 2 comprises an upper flexible sheet, or wall, 10, connected to a lower flexible sheet, or wall, 12, by a plurality of spaced flexible inner ribs 14, and end ribs 16, generally having an airfoil shape. These spaced ribs 14 and 16 form cells, 18. The forward edges of the upper flexible sheet, or wall, 10 and lower flexible sheet, or wall, 12 are spaced to provide an open ram air scoop for inflating the cells 18. The trailing edges of the upper flexible sheet, or wall, 10 and lower flexible sheet, or wall, 12 are shown closed to form trailing edge 6. The trailing edge may be open as shown in the prior art, if desired.

Figure 2:
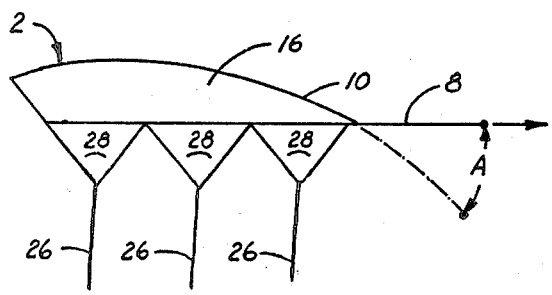
FIG. 2 is a side view of the canopy and rearwardly extending flap taken from the right of FIG. 1.

The triangular flaps 4 and 8 each has its trailing apex connected to a tail 20 by control lines 22 and 24, respectively. The tail 20 is shown as a plurality of ribbons of flexible material. In the event a downdraft, or other wind movement, acts downwardly on one corner, or both, of the canopy 2 and cooperating rearwardly extending flap 4, or 8, to move them downwardly (see A in FIG. 2), the weighted tail 20, shown as elongated ribbons, by its drag will extend the downwardly extending flap or flaps rearwardly and stabilize the canopy flight position. These flaps 4 and 8 provide a stabilizing effect on the canopy 2 in flight. The supporting, or suspension, lines 26 are connected to the lower flexible sheet, or wall, 12 by flares, or wedge-shaped material, 28. For tethered flight, the plurality of supporting lines 26 all meet at a point under the canopy 2 and are connected to a single line (not shown) which extends down to an operator, or some other holding device.

While flares, or wedge-shaped material, 28 are shown for connecting the supporting, or suspension, lines 26 to the lower flexible sheet, or wall, 12, many other connecting means may be used as disclosed in the prior art. For example, the supporting, or suspension, lines 26 can be connected directly to the lower flexible sheet, or wall, 12. Both connecting flares 28 and direct connection of the supporting, or suspension, lines 26 to the lower flexible sheet, or wall, 12 are shown in U.S. Pat. No. 3,285,546 (U.S. Pat. No. Re. 26,427) to Domina C. Jalbert. While the rearwardly extending flaps 4 and 8 are shown overlapping the lower flexible sheet 12, they may overlap the upper flexible sheet 10, or be fixed therebetween where the upper and lower flexible sheets, 10 and 12, meet to form the trailing edge 6.

Figure 3:
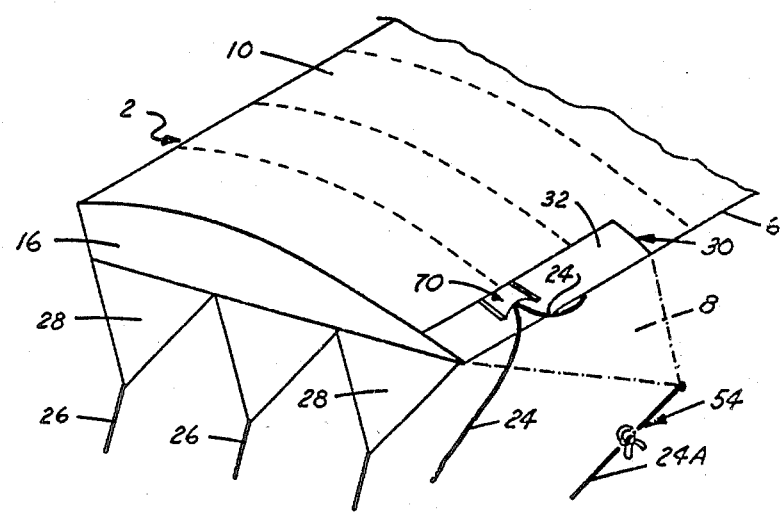
FIG. 3 is a perspective view from above of one end of a modified form of the canopy of FIG. 1 having containment means for a rearwardly extending control flap with the control line extending below the canopy for manual or automatic operation; the control flap is shown extended in phantom.

In FIG. 3, an end portion showing the top of a canopy is shown. A containment means 30 is positioned on upper flexible sheet 10 adjacent rearwardly extending flap 8 and rearwardly extending flap 4 (not shown) to hold said flap 8 and flap 4, folded against the flexible upper sheet, or wall, 10, when the rearwardly extending flaps 8 and 4 are not needed. This containment means 30 (1) reduces interference of air flow over the rearwardly extending flaps; and (2) protects the flaps. For example, the rearwardly extending flaps are not needed when a jump is made by a parachutist and the free-falling parachutist opens his canopy 2; after the canopy 2 has opened, and the descent of the parachutist has slowed down, the control lines 22 (not shown) and 24 can be pulled to release the folded flaps for control. Control lines 22 and 24 extend to the parachutist's harness for his use, as is well known in the art. For automatic operation involving a cargo drop, the control lines can extend to a radio-controlled device, for example.

A containment means 30 comprises a small closure flap 32 fixed to the upper flexible sheet, or wall, 10, at its forward end 34, a short distance forward of the trailing edge 6 of the canopy 2 and at its sides, and it extends towards the trailing edge 6 of the canopy 2 where its rearward end 36 can be releasably connected adjacent the trailing edge 6 by connecting means 40. Connecting means 40 is shown as two cooperating velcro strips 42 and 43, strip 42 being fixed adjacent the trailing edge 6 on the upper flexible sheet, or wall, 10 with strip 43 being fixed on small closure flap 32 at the rearward end 36. Each of the velcro strips can be continuous or made up of small strips to achieve the desired connection of the rearward end 36 of small closure flap 32 to the rear portion of the upper flexible sheet, or wall, 10 adjacent the trailing edge 6. Other connecting means 40 can be used which will permit the rearward edge 36 to be pulled away from the upper flexible sheet, or wall, 10; for example, a plurality of pressed together snaps can be used, such as used on some parachute containers.

It can be seen that the strip 43 is fixed on the side of the small closure flap 32 away from the upper flexible sheet, or wall, 10, as the small closure flap 32 extends rearwardly. This positioning permits the small closure flap 32, when moved to a closed position for connecting its velcro strip 43 to velcro strip 42 of said canopy 2, to be turned inwardly and forwardly for attachment, making a smooth appearance.

A cooperating rearwardly extending flap is folded and placed in a space 50 formed by the small closure flap 32 and upper flexible sheet, or wall, 10 when, for example, a canopy 2 is being prepared for a jump. A control line extends externally of the space 50 between the velcro strips 42 and 43, see control line 24 in FIG. 4, so that the folded flap can be pulled from the space 50 by its control line, forcing the velcro strips 42 and 43 apart.

Figure 4:
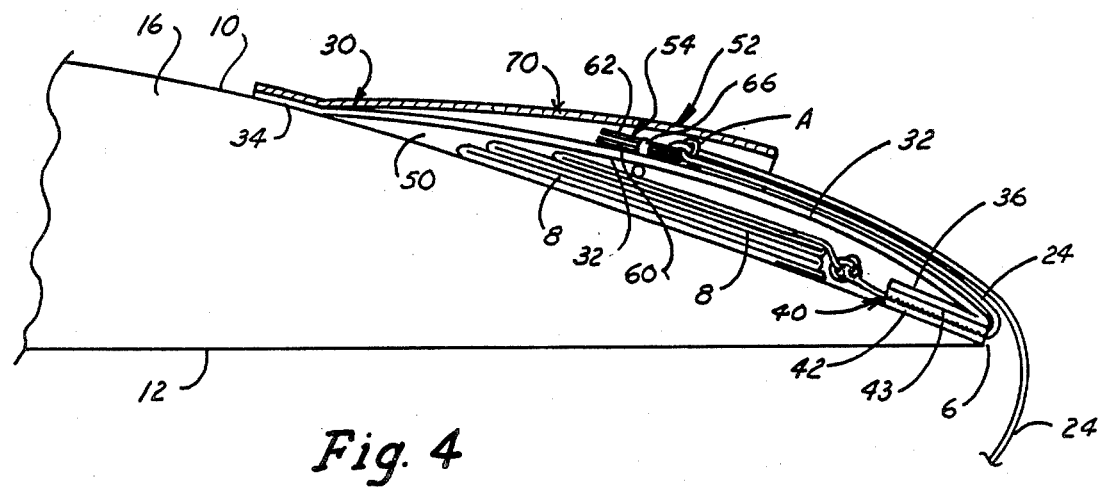
FIG. 4 is a fragmentary side view of the rear end of the canopy of FIG. 3 with the small closure flap of the containment means opened to show the control flap folded therein, with the control line extending outwardly therefrom to a safety holding device.
Figure 5:
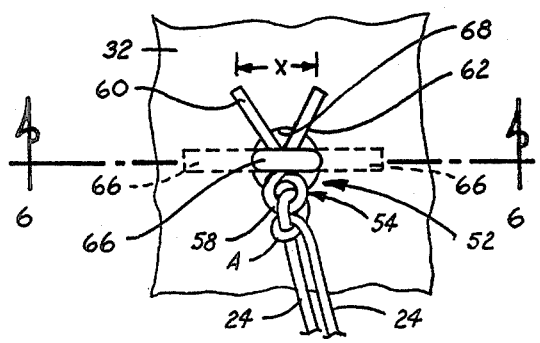
FIG. 5 is a fragmentary top view of the small closure flap under the protective cover with the safety holding device having the spring device in the cooperating rearwardly facing holding opening.

Each control line 22 and 24, is provided with a control line safety holding means 52 to control accidental release of a flap from its containment means 30. Control line safety holding means 52 comprises a spring device 54 and cooperating holding opening 64, said spring device 54 being attached to a control line at "A" and requiring a pull of a predetermined force on the control line to remove said spring device 54 from said cooperating holding opening 64. As shown in FIGS. 4 and 5, the control line 24 is fixed to its spring device 54 by a knot "A"; other fixing means can be used if desired. Removal of spring device 54 from said cooperating holding opening 64 releases the control line so that it can then directly pull a flap from its cooperating containment means 30, said flap forcing connecting means 40 apart.

Figure 6:
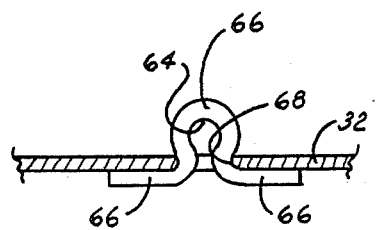
FIG. 6 is a view taken on the line 6—6 of FIG. 5 omitting the spring device.

Spring device 54 is a short coil spring 58 having two straight portions 60 and 62, one at each end, said straight portions 60 and 62 crossing, placing the tips of the ends a predetermined distance "X" apart. A cord 66, forming a holding opening 64, is provided on the top of the small closure flap 32 facing rearwardly to receive the straight portions 60 and 62 (see FIG. 6) when said straight portions 60 and 62 have their ends squeezed together to fit into the holding opening 64. The holding opening 64 is formed by a piece of cord 66 fixed to the bottom of the small closure flap 32 with a looped portion extending through an opening 68 in the small closure flap 32. While one means for forming a holding opening 64 is shown, any means forming such a holding opening can be used. Further, other control line safety holding means can be used to prevent premature release of the control flap from its containment means 30.

A protective cover 70 is fixed on the small closure flap 32 over the spring device 54 and portion of cord 66 forming the holding opening 64. The rear part of the cover 70 is not attached to the small closure flap 32 to allow for insertion of the straight portions 60 and 62 of spring device 54 into the holding opening 64.

The amount of force required to pull the spring device 54 from its cooperating holding opening 64 can be varied, for example, by: (1) controlling the size of the holding opening 64; (2) changing the spring device 54 to one having a coil spring 58 with a different spring rate; (3) changing the spring device 54 to one having longer, or shorter, straight portions 60 and 61; and (4) changing the spring device 54 to one having the distance "X" longer, or shorter.

Figure 7:
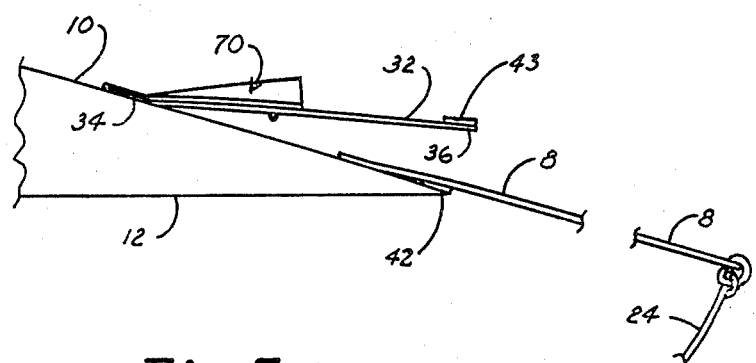
FIG. 7 is a fragmentary side view of the rear end of the canopy showing the small closure flap open and the control flap extending rearwardly.
Figure 8:
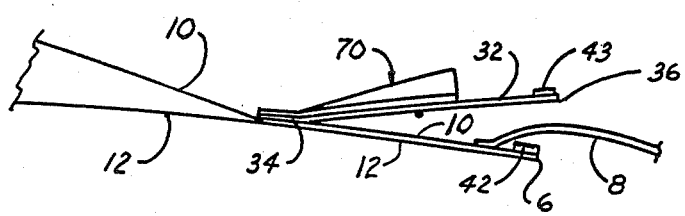
FIG. 8 is a fragmentary side view similar to FIG. 7 showing a construction where the top sheet and bottom sheet are brought together and the control flap, small closure flap, and velcro strip are fixed thereto.

While FIG. 7 shows the control flap 8 and small closure flap 32 connected to only the upper flexible sheet, or wall, 10, FIG. 8 shows a construction where the control flap 8 and small closure flap 32 are connected to both the upper and lower flexible sheets, or walls, 10 and 12, respectively. This construction is easier to form when the control flap 8 and containment means 30 is added to an existing canopy 2.

Figure 9:
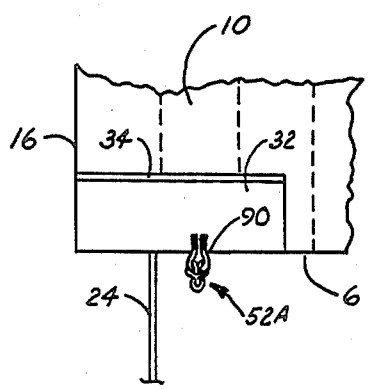
FIG. 9 is a top view of the containment means as shown in FIG. 3 with a modified safety holding device for the control line including an elastic, or rubber, band.
Figure 10:
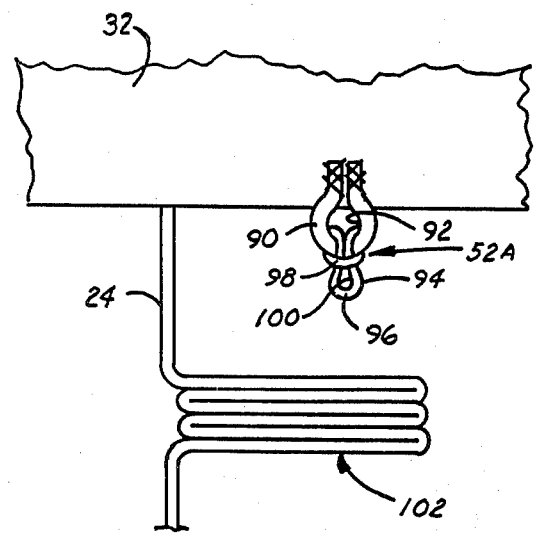
FIG. 10 is an enlarged fragmentary view of the control line and modified safety holding device of FIG. 8.
Figure 11:
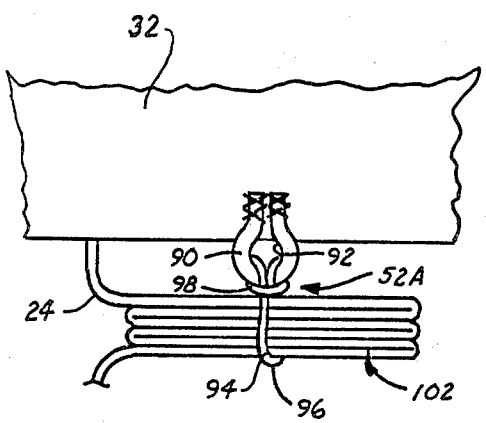
FIG. 11 is a view similar to FIG. 10 where the control line is folded and placed within the elastic, or rubber, band.

A modified control line safety holding means 52A is shown in FIGS. 9–11. A cord 90, forming an opening 92, is fixed to the small closure flap 32 so that it extends downstream of the trailing edge of the canopy. While it is shown sewed, it can be fixed by other means, and other means can form the attachment to the small closure flap 32 having an opening 92. The preferred location for the cord 90 is in a mid-portion of the small closure flap 32.

A small elastic, or rubber, band 94 is fixed to the cord 90 through its opening 92. As shown in FIG. 10, the elastic band 94 has one folded end 96 placed through the opening 92 and fed around the cord 90 through the other folded end 98 of the elastic band 94. This fixes the elastic band 94 to the cord 90 through opening 92, and presents an opening 100 of its own.

To control accidental release of a flap by inadvertent movement of the control line, such as by the wind, the control line 24 is folded back and forth upon itself for a desired number of times, see FIG. 10, forming a bundle 102; the opening 100 of the elastic band 94 is then stretched to receive the bundle 102 and released over the bundle 102 to hold it together, see FIG. 11.

The amount of force required to pull the control line 24 from the bundle 102 held by the elastic band 94 can be varied by controlling the size of the elastic band 94 and strength of the elastic, or rubber, used; the bundle 102 can be made larger with the same size elastic band 94 to put more resistance to withdrawal of the control line 24 from the bundle 102.

Figure 12:
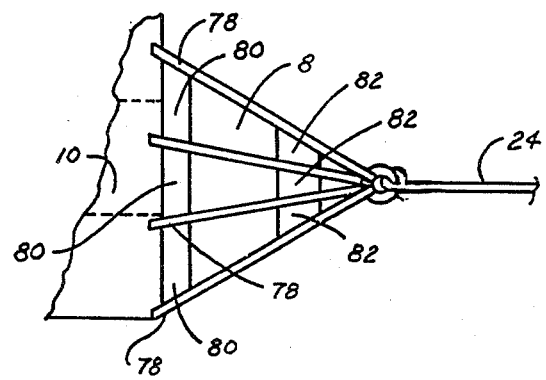
FIG. 12 is a top view of a control flap with the connecting side spaced from the trailing edge of the canopy, and the rear of the flap is opened.

The control flap 8 can have the connected forward edge spaced from the trailing edge 6 of the canopy 2 by straps 78 forming openings 80, or have openings placed in the material. FIG. 12 shows a control flap with straps 78 extending from the apex to the forward side. At the apex, the straps are looped to form an attachment point for a control line. Openings 82 can also be formed at the apex to further control air flow through the control flap. The size of the openings can be varied depending on many factors; for example, to control the size of the control flaps and to obtain a desired flap movement for a canopy mission. The control flap 8 can be formed having a pocket therein if desired. The flap can be formed of smaller triangular portions with the adjacent sides having a curve extending away from the smaller triangular portions; when the curved sides are fixed together, a flap is formed with a built-in-pocket.

Figure 13:
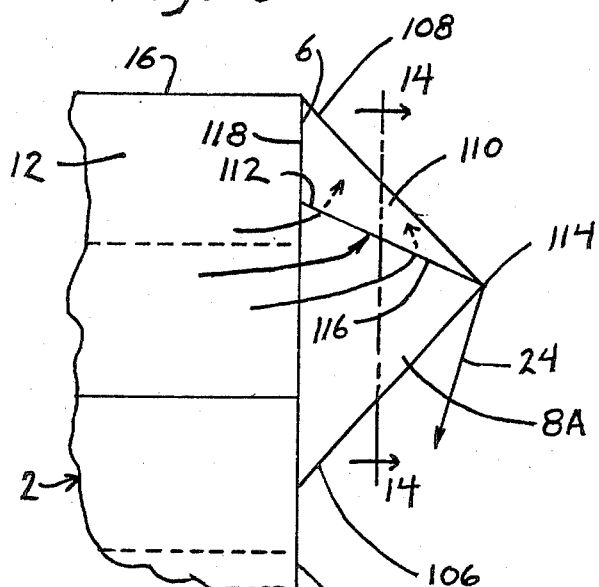
FIG. 13 is a view from below a left triangular control flap showing a stabilizing edge pocket and its opening.
Figure 14:
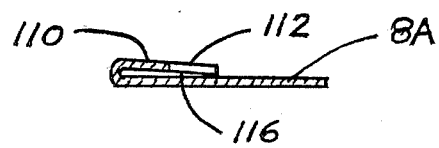
FIG. 14 is a view taken on the line 14—14 of FIG. 13 showing the opening of the control flap.

For stabilization, an edge pocket 110 can extend along the outer edge 108 of each control flap 4A and 8A (see FIG. 16). In FIG. 13, an edge pocket 110 is shown extending from the trailing edge 6 of a canopy (as shown in FIG. 1) to the trailing apex 114 of a left triangular control flap 8A. An inner edge 112 of the edge pocket 110 is open at 116 and extends inwardly to receive air flow from below the lower wall 12 of the canopy 2. A forward edge 118 is fixed to the trailing edge 6 along its length.

The outer edge 108 and inner edge 106 of a control flap 8A are angled, and are of a length to provide an equal distribution of forces on the trailing edge 6 of the canopy when force is applied to the control line 24, or 22, as is well known in the art.

Figure 15:
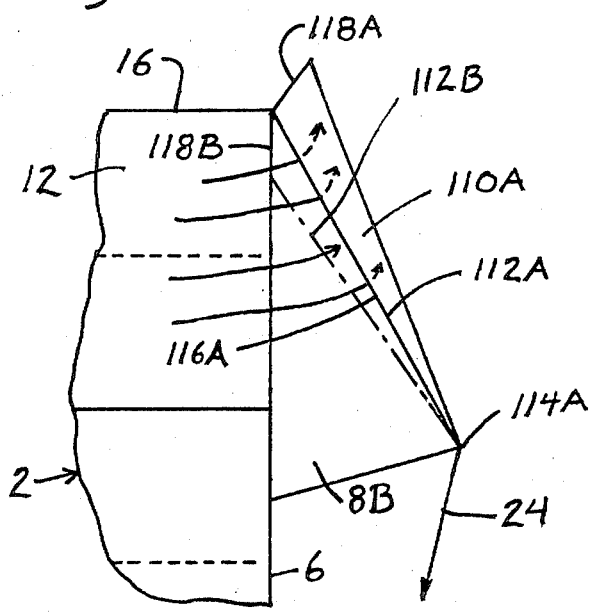
FIG. 15 is a view similar to FIG. 13 showing a preferred modification of the control flap with the control flap extending over the end of the trailing edge and with the extended end of the control flap forming the forward end of the edge pocket; said forward end of the edge pocket being open for the passage of air therethrough.

The preferred modification of the control flap 8B of FIG. 15 shows the control flap 8B with its forward edge extending to the side of said canopy 2 past the end, or side, rib 16. The edge pocket 110A has as its forward edge 118A, the extension of said control flap 8B past the end, or side, rib 16; the open end 116A of said edge pocket 110A extends from the end of the trailing edge 6 to the trailing apex 114A. The forward edge 118A is open to allow air flow therethrough. The edge pocket 110A can have its inner side 112A moved to phantom line 112B if a larger edge pocket is desired. The additional width would have its forward edge 118B closed. The size of the opening in forward edge 118A can be varied to obtain a desired air flow and force on the edge of the control flap 8B.

An edge pocket 110 can be formed by sewing, or otherwise fixing, a separate flexible sheet to the outer edge 108 of a flexible sheet forming the control flap 8A; or a flexible sheet forming the control flap 8A can be bent over and sewed, or fixed, to the control flap 8A, forming the outer edge 108 of the control flap 8A and the edge pocket 110.

Referring to FIG. 16, a perspective view is shown of a canopy smaller than that of FIG. 1, with the supporting, or suspension, lines 26 connected directly to a main supporting ring 130; main supporting ring 130 being in turn connected to a tether or supporting line 136. Control lines 22 and 24 are connected to the trailing apex 114 of each of the control flaps 4A and 8A, said control flaps having pockets 110. Two secondary control rings 122 and 124 are connected to said main supporting ring 130. One secondary ring is attached to each side of the main supporting ring 130 by a length of cord; a cord 132 connects a secondary ring 122 to the right side and a cord 134 connects a secondary ring 124 to the left side. Control line 22 extends from trailing apex 114 of control flap 4A through secondary ring 122 and down to a controller on the ground, if tethered, or to a remote controlled device; while control line 24 extends from trailing apex 114 of control flap 8A through secondary ring 124 and down to the controller, as control line 22.

I claim:

1. In combination, a ram air wing type flexible canopy, said canopy having a trailing edge, a rearwardly extending control flap fixed to said canopy on each side thereof having an upper and lower surface, each rearwardly extending control flap extending rearwardly of said trailing edge, means connecting a control line to each rearwardly extending control flap to place it in a desired position for proper flight, each control flap having an outer edge extending rearwardly of the canopy trailing edge, an edge pocket extending along the outer edge of each control flap, and each pocket having an inwardly facing opening to said lower surface, said opening extending along the length of each pocket, each opening being positioned to receive air flow from below the trailing edge of said canopy.

2. A combination as set forth in claim 1 wherein each control flap is triangular in shape, means attaching one side of said triangular shape to the trailing edge of said canopy, means connecting each control line to the downstream apex of its cooperating triangular control flap, the outer edge of each triangular control flap extending rearwardly to said apex.

3. A combination as set forth in claim 2 wherein said edge pocket is triangular in shape.

4. A combination as set forth in claim 1 wherein each control flap is a first flexible sheet, and each edge pocket is formed by a second flexible sheet extending inwardly from the outer edge of the first flexible sheet forming its cooperating control flap.

5. A combination as set forth in claim 4 wherein each second flexible sheet is a portion of said first flexible sheet bent over to form the outer edge of the control flap and the edge pocket.

6. A combination as set forth in claim 4 wherein each second flexible sheet has a forward edge, said forward edge of each second flexible sheet is fixed to the first flexible sheet of its cooperating control flap, and the inner edge of each second flexible sheet forms an opening with the first flexible sheet of its cooperating control flap.

7. A combination as set forth in claim 1 wherein said canopy has a side edge on each side, each control flap being fixed to said trailing edge, the outer edge of each control flap having a portion extending to the side of said canopy past said side edge, the portion of each control flap extending to the side having a forward edge, the edge pocket of each control flap extending to the forward edge, said edge pocket being open at said forward edge to allow air flow therethrough.

8. A combination as set forth in claim 7 wherein each control flap is triangular in shape, means attaching one side of said triangular shape to the trailing edge of said canopy, means connecting each control line to the downstream apex of its cooperating triangular control flap, the outer edge of each triangular control flap extending rearwardly to said apex.

9. A combination as set forth in claim 8 wherein each edge pocket is triangular in shape and has a downstream apex located at the downstream apex of its cooperating triangular control flap.

10. A combination as set forth in claim 9 wherein said inwardly facing opening extends to said downstream apex downstream of said canopy trailing edge.

* * * * *